April 11, 1967
J. W. SCHAEFER
3,313,428
CLUTCH MECHANISM FOR AN UNLOADING APPARATUS
Filed Feb. 23, 1965
2 Sheets-Sheet 1
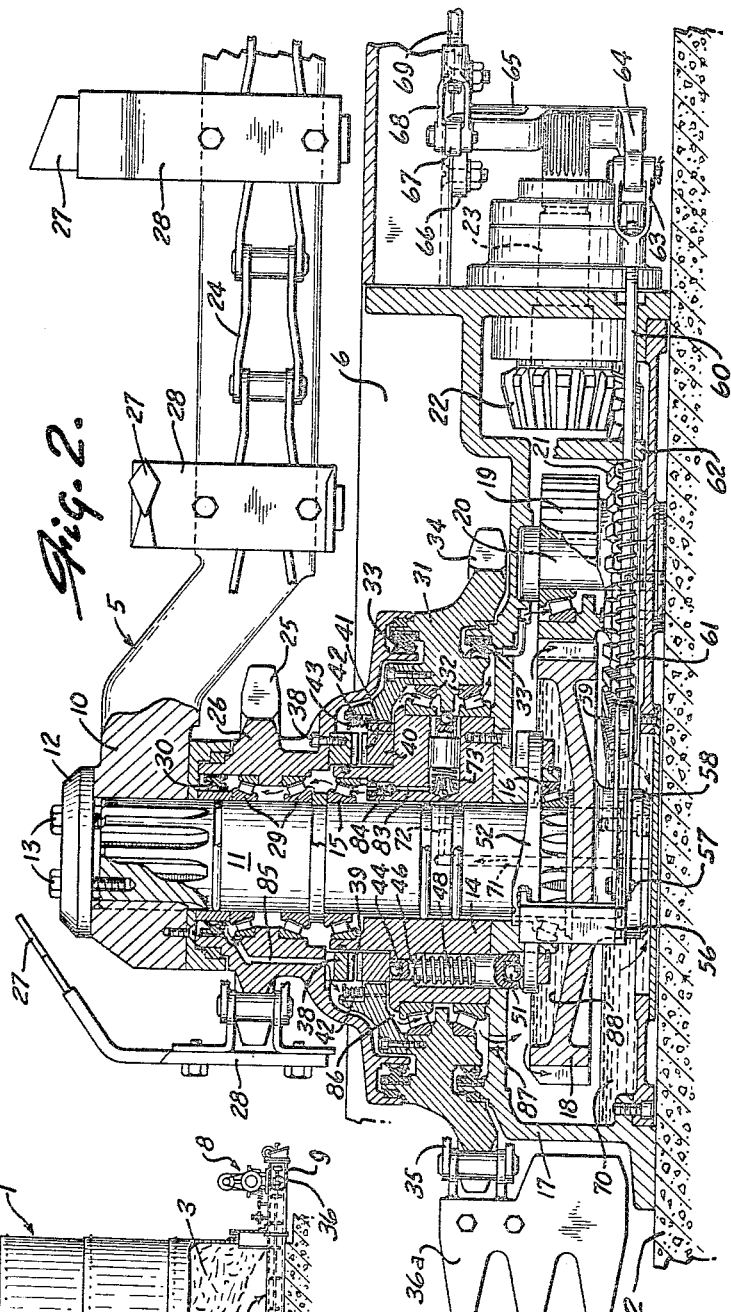
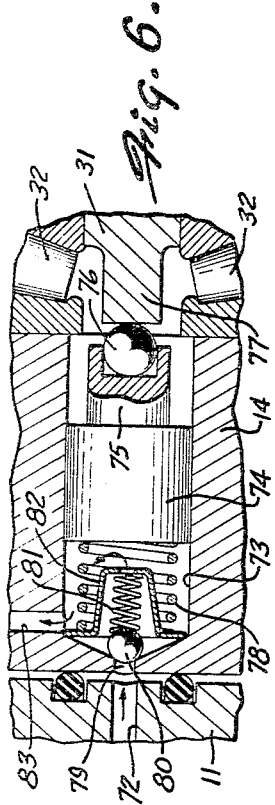
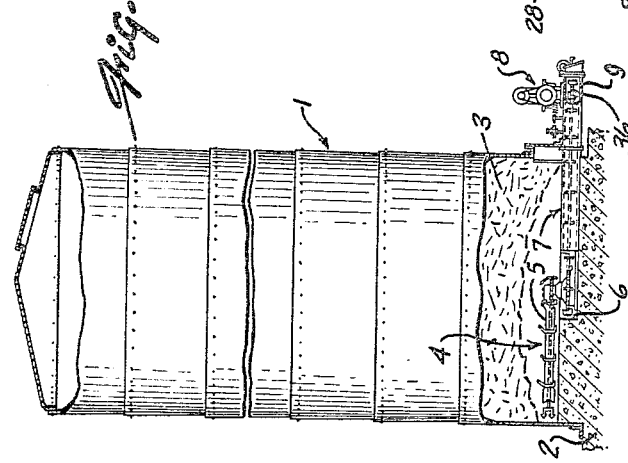
INVENTOR.
JOHN W. SCHAEFER
BY
Andrus & Starke
ATTORNEYS April 11, 1967  J. W. SCHAEFER  3,313,428
CLUTCH MECHANISM FOR AN UNLOADING APPARATUS
Filed Feb. 23, 1965  2 Sheets-Sheet 2
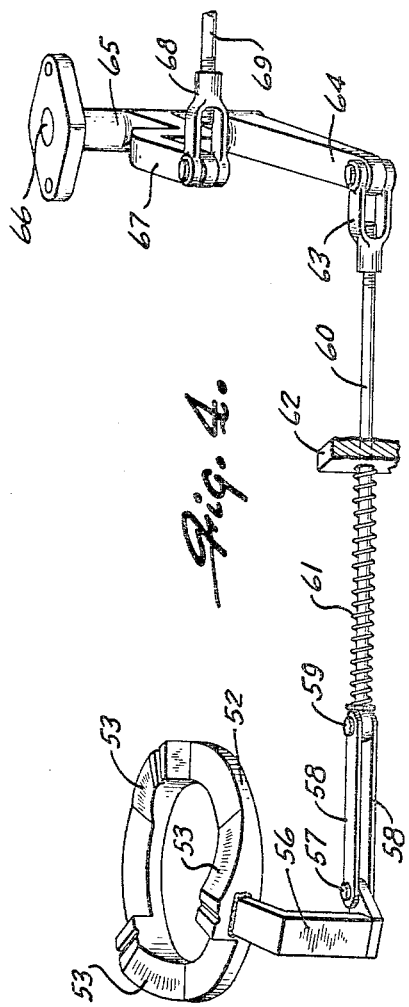
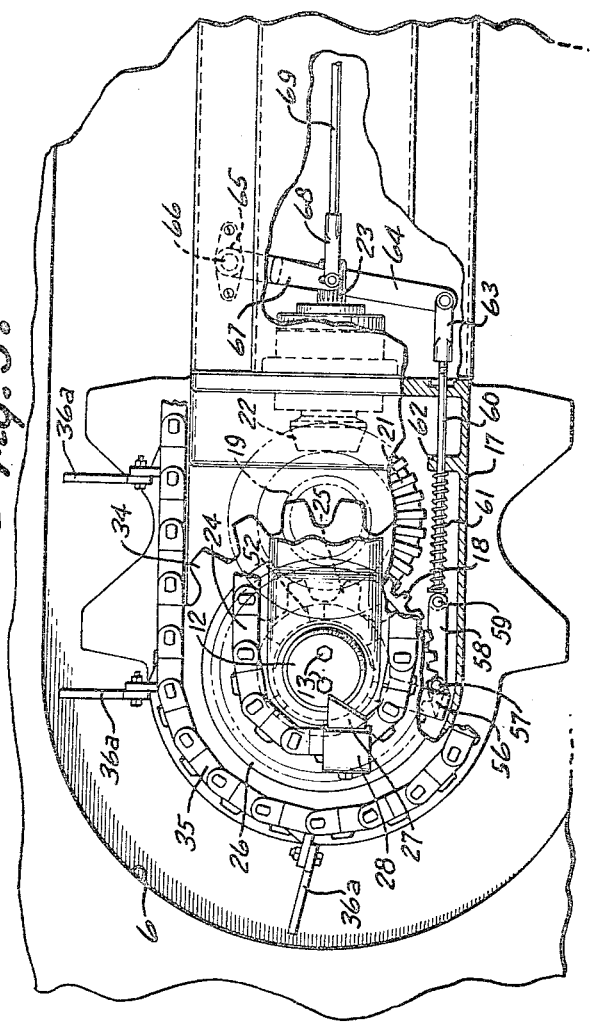
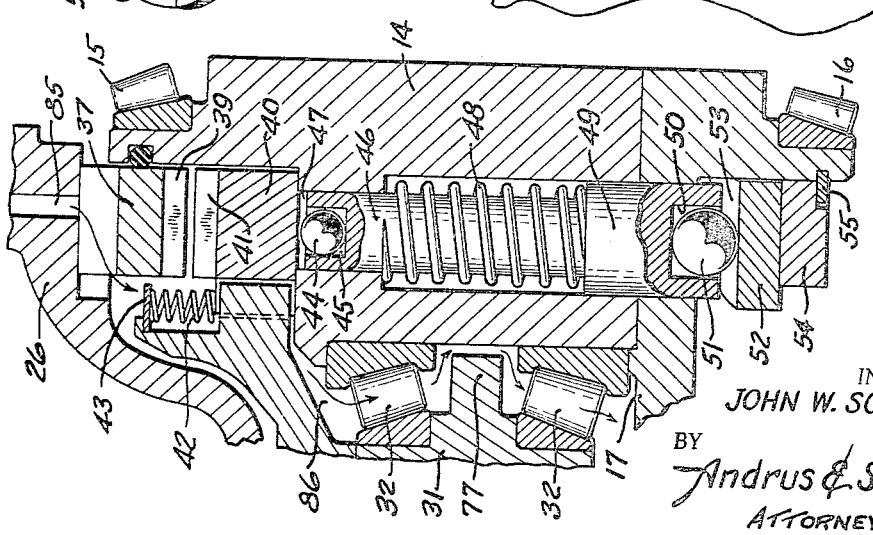
INVENTOR.
JOHN W. SCHAEFER
BY
Andrus & Starke
ATTORNEYS

United States Patent Office 3,313,428
Patented Apr. 11, 1967

3,313,428
CLUTCH MECHANISM FOR AN UNLOADING APPARATUS
John W. Schaefer, Barrington, Ill., assignor to A. O. Smith Harvestore Products, Inc., Arlington Heights, Ill., a corporation of Delaware
Filed Feb. 23, 1965, Ser. No. 434,420
8 Claims. (Cl. 214—17)

This invention relates to an apparatus for unloading a stored material from a storage structure such as a silo and more particularly to a clutch mechanism for an unloading apparatus.

Storage structures, such as a silo, can be unloaded by a bottom unloading mechanism which is located on the floor of the silo and undercuts the stored material and conveys it to the exterior. An unloading device of this type generally includes a cutter arm which is journaled for rotation at the center of the silo and slowly rotates within the silo beneath the stored material. The cutter arm carries a cutting mechanism such as an endless cutter chain which dislodges the silage or other stored material and moves it towards the center of the silo where it is delivered to the central portion of a radially extending trough formed in the floor or foundation of the silo. A conveyor unit operates within the trough and conveys the loosened or dislodged material to the exterior of the silo.

In the conventional bottom unloader, the cutting mechanism and the conveyor unit both include an endless chain, each of which travels over a central sprocket journaled around a central vertical post in the silo. The conveyor unit chain is driven in an endless path by a drive sprocket located on the exterior of the silo, and rotation of the central driven sprocket of the conveyor unit is transmitted to the central sprocket of the cutter arm chain to drive the cutter arm chain as the cutter arm slowly rotates within the silo.

In some situations when the storage structure contains free flowing material, such as shelled corn, flour, wood meal or the like, it is not necessary to dislodge the material, for the material will flow by gravity downwardly into the conveyor. The present invention is directed to a clutch mechanism which enables the cutter arm chain to be selectively disengaged while the conveyor chain is operating. More specifically, the cutter arm chain is carried by a sprocket which is mounted on an upper sprocket hub journaled on the central post, while the conveyor chain is carried by a sprocket mounted on a lower sprocket hub and which is also journaled on the central post. The upper and lower sprocket hubs each support mating gear rings, and the gear ring on the lower sprocket hub is urged out of engagement with the gear ring on the upper sprocket hub by a series of coil springs. When the gear rings are disengaged, the conveyor chain will operate but the cutter arm chain will not operate.

To engage the clutch rings, a series of lift pins are moved upwardly by a cam mechanism to raise the lower gear ring into mating engagement with the upper gear ring. When the gear rings are in the engaged position, rotation of the lower sprocket hub will be transmitted to the upper hub to thereby drive the cutter arm chain. With this structure, the cutter arm chain can be selectively disengaged so that only the conveyor unit will operate.

The unloading unit of the invention also includes a novel lubricating system in which rotation of the conveyor sprocket hub operates a pump to circulate a lubricating medium through the various bearing assemblies in the drive mechanism as well as through the clutch mechanism.

Other objects and advantages will appear in the course of the following description.

The drawings illustrate the best mode presently contemplated of carrying out the invention.

In the drawings:

FIG. 1 is an elevational view of a silo, with parts broken away, incorporating the unloading mechanism of the invention;

FIG. 2 is an enlarged fragmentary vertical section showing the connection of the cutter arm chain and the conveyor chain to the central post and the clutch mechanism;

FIG. 3 is an enlarged fragmentary plan view with parts broken away of the central drive mechanism;

FIG. 4 is a schematic view showing the cam operating mechanism;

FIG. 5 is an enlarged fragmentary vertical section showing the clutch elevating structure; and FIG. 6 is an enlarged fragmentary section of the pump for the lubricating medium.

The drawings illustrate a storage structure or silo 1 which is supported on the foundation 2 and is adapted to contain a stored material 3, such as corn silage, grass silage, shelled corn, chopped ear corn, soy meal, sugar, flour or the like. The material 3 is introduced into the silo 1 through a suitable inlet at the top of the structure and is removed by means of a mechanical unloader 4 located at the bottom of the silo.

The unloader 4 includes a cutter arm 5 which is rotatably mounted at the center of the silo and rotates within the silo to cut and dislodge the stored material 3 and deliver the material to the center of the silo.

A radially extending trough 6 is formed in the foundation 2 and the stored material is delivered to the central portion of the trough where a conveyor unit 7 conveys the material to the exterior of the silo.

The rotating cutter arm 5 and conveyor unit 7 are driven by a drive unit 8 which is secured to a conveyor housing 9 on the outside of the silo 1.

The cutter arm 5 includes a central hub 10 which is secured to the upper end of a vertical post or shaft 11 mounted at the center of the silo. Hub 10 is secured to the shaft 11 by a cover 12 and bolts 13 extend through the cover and are threaded within openings in the upper end of the shaft 11.

The central shaft 11 is journaled for rotation within a stationary sleeve 14 by a pair of bearing assemblies 15 and 16. The lower end of the sleeve 14 is bolted to a base casting 17 which rests on the foundation 2 within the trough 6.

To rotate the shaft 11 and drive the cutter arm within the silo, a gear 18 is keyed to the lower end of the shaft and the gear engages a pinion 19 on shaft 20. Shaft 20 also carries a bevel gear 21 which engages gear 22 secured to a horizontal shaft 23. Shaft 23 is driven by the drive unit 8 in a manner described in the Tiedemann Patent 2,635,770. Rotation of the shaft 23 acts through the gears 22, 21, 19 and 18 to rotate the central shaft 11 at a slow rate of speed, generally in the range of 1 to 2 r.p.m. to thereby rotate the cutter arm 5 around the silo.

The silage is dislodged and moved toward the center of the silo by cutter chain 24 which is supported on the cutter arm 5. The chain 24 is trained over sprocket 25 secured to the upper sprocket hub 26 and over a second sprocket, not shown, journaled on the outer end of the cutter arm 5. The chain 24 is a conventional roller length chain including a series of links which are joined together by vertical pins. Silage is dislodged by a series of cutter teeth 27 attached to support bars 28 mounted on the chain 24. The teeth 27 engage and dislodge the silage as the chain 24 moves in an endless path on the cutter arm 5 and move the loosened silage toward the center of the silo, where it falls into the central portion of the trough 6.

Upper sprocket hub 26 is journaled on the shaft 11 by a pair of bearing assemblies 29 and silage or other foreign material is prevented from contacting the bearings 29 by a suitable seal 30 which is located in the space between the hub 26 and the shaft 11.

A lower sprocket hub 31 is located beneath the upper sprocket hub and is journaled on the sleeve 14 by a pair of bearing assemblies 32. To prevent silage or other material from contacting the bearings 32, seals 33 are located within the clearance between the hub 31 and the hub 26 and also within the clearance between the hub 31 and the base casting 17.

Mounted on the hub 31 is a sprocket 34 which supports an endless roller link chain 35. Chain 35 is driven in an endless path by a drive sprocket 36 located within the conveyor housing 9 outside of the silo 1. The sprocket 36 is driven by a drive mechanism similar to that shown in the Tiedemann Patent 2,635,770 and rotation of the drive sprocket 36 serves to drive the conveyor chain 35 and the sprocket 34. The chain 35 carries a series of conveyor paddles 36a which convey the dislodged silage within trough 6 to the discharge housing 9.

In the conventional bottom unloader such as that shown in the Tiedemann Patent 2,635,770, movement of the conveyor chain 35 is transmitted to the cutter chain 24 so that they operate in unison. Under certain conditions, particularly when the silo is used to store free flowing material such as shelled corn, flour and the like, it is not necessary to rotate the cutter arm 5 nor to operate the cutter chain 24, for the material will flow downwardly by gravity into the trough 6 and be discharged by operation of the conveyor unit 7. Under these circumstances it is desirable to have a separate drive for the cutter arm chain so that the cutter chain 24 can be disengaged while the conveyor chain 35 is operating.

According to the invention, a clutch mechanism is employed to selectively engage the upper hub 26 with the driven lower hub 31. The clutch mechanism includes a clutch ring 37 which is secured to the upper hub 26 by a series of bolts 38 and the clutch ring 37 is provided with a series of downwardly extending teeth 39. A mating clutch ring 40 is mounted on the lower sprocket hub 31 and is provided with a series of upwardly extending teeth 41 which engage the teeth 39 of the upper clutch ring 37. A spline connection between the ring 40 and the hub 31 permits the ring 40 to move vertically with respect to the fixed hub 31.

The lower clutch ring 40 is urged downwardly out of engagement with the upper clutch ring 37 by a series of coil springs 42 which bear between the upper surface of the clutch ring 40 and a lip 43 formed on the hub 31.

To engage the clutch members 37 and 40 the lower ring 40 is moved upwardly by a lifting mechanism. As best shown in FIG. 5 the ring 40 is supported on a series of balls 44 which are mounted in recesses 45 formed in the upper end of lift pins 46. The lift pins 46 are slidably mounted within holes 47 formed in the sleeve 14. Coil springs 48 are disposed around the lift pins 46 and bear against the lower head 49 of the pins to urge or bias the pins downwardly.

Mounted in a recess 50 in the lower end of each lift pin 46 is a ball 51 which is adapted to ride on the upper surface of the cam plate 52 mounted for rotation on the lower end of the sleeve 14. Cam plate 52 is provided with a series of inclines 53, and as the cam plate is rotated the balls 51 ride up the inclines 53 to raise the lift pins 46 and thereby move the lower clutch ring 40 upwardly into engagement with the clutch ring 37. Engagement of the clutch rings serves to transmit rotation to the upper sprocket hub 26 to thereby drive the cutter chain 24. The upper end of each incline 53 is provided with a recess or detent to hold the ball 51 and prevent the ball from slipping down the incline.

The cam plate 52 is supported on a bearing 54 which is positioned on the sleeve 14 by a snap ring 55.

To rotate the cam plate 52 generally L-shaped arm 56 is connected to the cam plate 52 and the arm extends horizontally beyond the periphery of gear 18 and then downwardly within the base casting 17. As best shown in FIG. 4, the lower end of the arm 56 is pivotally connected by pin 57 to a pair of horizontal links 58 and the opposite ends of links 58 are connected by pin 59 to rod 60. The rod 60 is urged in a direction toward the arm 56 by a coil spring 61 which bears between the ends of the links 58 and wall 62 of casting 17. The opposite end of the rod 60 is connected by a yoke 63 to one end of a horizontal link 64, and the opposite end of link 64 is secured to a sleeve 65 journaled on shaft 66. One end of an arm 67 is also secured to the sleeve 65 and overlies link 64 while the opposite end of arm 67 is pivotally connected to a yoke 68 secured to a control rod 69 which extends outwardly through the trough 6 to the exterior of the silo. With this linkage, pulling the control rod 69 outwardly will move rod 60 in a similar direction and thereby rotate the cam plate 52 to move the lift pins 46 upwardly and engage the clutch. Conversely, by moving the control rod 69 inwardly the rod 60 is moved in a similar direction which rotates the cam plate 52 in the opposite direction to thereby lower the lift pins 46 and disengage the clutch mechanism.

The present invention permits the cutter arm chain to be selectively disengaged so it will not travel while the conveyor chain is operating. Disengagement of the cutter arm chain is particularly desirable when the storage structure contains a free flowing material which will flow by gravity downwardly into the trough 6. In this case it is not necessary to rotate the cutter arm 5 nor to move the cutter arm chain 24 and the cutter arm is normally rotated only after the material has been substantially moved from the silo. Rotation of the cutter arm 5 and movement of the cutter arm chain 24 is then employed to collect material which still remains on the silo floor and move the material into the trough 6.

The clutch mechanism can also be used in certain circumstances when the storage structure contains a non-free flowing material such as silage. In this situation, it may be desired to operate the conveyor without the cutter arm in order to clean out the conveyor trough or remove an accumulation of silage without having the additional load of the cutter arm on the motor.

The invention also includes a novel lubricating system in which oil or other lubricating liquid is automatically circulated throughout the bearing during operation of the unloader. The lower portion of the base casting 17 defines a sump 70 which contains a quantity of oil or other lubricating medium. Oil is withdrawn from the sump 70 through an axial passage 71 which is formed in the post 11 and the upper end of the passage 71 is connected to a radially extending passage 72. The outer end of the radial passage 72 communicates with a pump chamber 73 which is formed in the sleeve 14. In the pump chamber, a piston 74 is mounted for sliding movement and the outer portion of the piston is provided with an extension 75 and a ball 76 is mounted within a recess in the end of the extension. To reciprocate the piston 74 within the chamber 73 sprocket hub 31 is provided with a series of lobes or projections 77 and the ball 76 rides over the projections 77 as the sprocket hub 31 rotates. As the ball 76 rides over the projections 77, the piston 74 will reciprocate within the pumping chamber 73. The ball 76 is urged outwardly, into engagement with the projections 77 by a spring 78 which bears against piston 74.

The inner end of the pumping chamber 73 is provided with an inlet opening 79 which is closed off by a ball-type check valve 80. The ball valve 80 is urged to a closed position by a spring 81 which is interposed between the ball and the spring cage 82. As the piston 74 reciprocates within the chamber 73, oil will be drawn from the sump through the passages 71 and 72 and will be discharged through the vertical passage 83. The upper end of passage 83 is closed off by a conventional check valve 84 which permits flow of the oil in an upward direction but prevents the flow of oil downwardly.

The oil leaving vertical passage 83 then flows through the bearing assembly 15, the pair of bearing assemblies 29 and then downwardly through the passage 85 formed in sprocket hub 26. The oil then flows, as indicated by the arrows, around the clutch members 37 and 40, then downwardly through the passage 86, through bearing assemblies 32 and through a hole 87 to the interior of the base casting 17.

The upper surface of the gear 18 defines a sump 88 and the oil flowing downwardly through the hole 87 collects within the sump 88 and continuously submerges the bearing assembly 16. Excess oil overflows outwardly from the sump 88 and serves to lubricate the teeth on the gear 18 and is collected within the sump 70.

The lubrication system serves to automatically pump the oil from the sump 70 and distribute the oil through the various bearing assemblies in the unloading mechanism. The pump is automatically driven by rotation of the sprocket hub 31 so that oil will be continuously supplied through the system as long as the hub 31 rotates. This system provides a convenient and inexpensive method of thoroughly lubricating all of the bearings in the cutter arm assembly, and the clutch members 37 and 40.

Various modes of carrying out the invention are contemplated as being within the scope of the following claims particularly pointing out and distinctly claiming the subject matter which is regarded as the invention.

I claim:

1. In a silo unloader, a vertical sleeve disposed centrally of the silo, a shaft journaled within the sleeve, a cutter arm secured to the upper end of the shaft and disposed to rotate within the silo, first drive means for rotating the shaft to thereby rotate the cutter arm within the silo, a first hub journaled around the axis of said shaft, a first sprocket mounted on said first hub, a cutter chain carried by said first sprocket and disposed to dislodge silage as the cutter arm rotates within the silo and move the silage toward the center of the silo, a second hub journaled on said sleeve, a second sprocket mounted on said second hub, a conveyor chain carried by said second sprocket and disposed to convey dislodged silage from the center of the silo to the exterior, second drive means operably connected to the second hub, a first clutch member carried by the first hub and having a series of teeth, a second clutch member associated with the second hub and having a series of teeth facing toward the teeth on said first member, means for mounting the second clutch member for sliding movement in an axial direction with respect to said second hub, means for biasing the second clutch member in an axial direction away from the first clutch member, means for moving said second clutch member in an axial direction to bring the teeth on the second clutch member into engagement with the teeth on the first clutch member to thereby transmit motion from the second hub to the first hub, and operating means connected to the last named means and extending to the exterior of the silo.

2. In a silo unloader, a fixed base member, a vertical shaft disposed centrally of the silo and mounted for rotation with respect to the base member, a cutter arm secured to the shaft and disposed to rotate within the silo, first drive means for rotating the shaft to thereby rotate the cutter arm within the silo, first sprocket means journaled on the base member, a cutter chain carried by said sprocket means for dislodging silage and moving it toward the center of the silo, second sprocket means journaled on said base member, a conveyor chain carried by said second sprocket means and serving to convey dislodged silage from the center of the silo to the exterior, second drive means operably connected to said second sprocket means, a first clutch member secured to said first sprocket means and having a series of circumferentially arranged teeth, a second clutch member secured to said second sprocket means and having a series of circumferentially arranged teeth facing toward the teeth on the first clutch member, said second clutch member being mounted for axial movement with respect to said second sprocket means whereby said second clutch member can be moved between a disengaged and an engaged position, resilient means for biasing the second clutch member in an axial direction to said disengaged position, a series of lifting members disposed in engagement with the bottom surface of said second clutch member, a cam ring mounted for rotation about said vertical shaft and having an inclined cam surface, said lifting members disposed to ride on said cam surface as the cam ring is rotated to thereby raise the lifting members and move the second clutch member into engagement with the first clutch member, and operating means extending to the exterior of the silo and connected to the cam ring for rotating the cam ring to thereby lift the lifting members and move the clutch member to the engaged position.

3. The structure of claim 2 in which the operating means extends within a trough in the foundation of the silo to the exterior of the silo.

4. The structure of claim 2 in which the operating means includes an arm which extends radially outward from the cam ring and then downwardly to avoid interference with said first drive means.

5. In a silo unloader, a fixed base member with the lower portion of said base member defining a sump adapted to contain a lubricating liquid, a vertical shaft disposed centrally of the silo and mounted for rotation with respect to the base member, a cutter arm secured to the shaft and disposed to rotate within the silo, first drive means for rotating the shaft to thereby rotate the cutter arm within the silo, first sprocket means journaled on the base member, a cutter arm carried by said sprocket means for dislodging silage and moving it toward the center of the silo, second sprocket means journaled on the base member, a conveyor member carried by said sprocket means and serving to convey dislodged silage from the center of the silo to the exterior, second drive means operably connected to said second sprocket means, clutch means interconnecting the first sprocket means and the second sprocket means for transmitting rotation of said second sprocket means to the first sprocket means when said clutch means is in the engaged position, conduit means providing communication between the sump and said clutch means, and pumping means operably connected to the second sprocket means and located in the conduit means for pumping the lubricating liquid through said conduit means and to said clutch means when said second sprocket means is operated.

6. In a silo unloader, a fixed base member with the lower portion of said base member defininig a sump adapted to contain a lubricating liquid, a vertical shaft disposed centrally of the silo and mounted for rotation with respect to the base member, a cutter arm secured to the shaft and disposed to rotate within the silo, first drive means for rotating the shaft to thereby rotate the cutter arm within the silo, first sprocket means carrying a cutter chain for dislodging silage and moving it toward the center of the silo, bearing means for journalling said first sprocket means on said shaft, second sprocket means carrying a conveying member with the conveying member serving to convey dislodged silage from the center of the silo to the exterior, second bearing means for journalling said second sprocket means about the axis of said shaft, second drive means operably connected to said second sprocket means, clutch means interconnecting said first sprocket means and said second sprocket means with the rotation of said second sprocket means being transmitted to said first sprocket means when said clutch means is in the engaged position, closed conduit means communicating between said sump, said clutch means and said first and second bearing means, and pumping means located in said conduit means and operably connected to said second sprocket means whereby rotation of said second sprocket means serves to actuate said pumping means and pump lubricating liquid through said conduit means to thereby lubricate said clutch means and said first and second bearing means.

7. The structure of claim 2 in which said lifting members comprise a series of circularly spaced pins, a series of bearings associated with the lower ends of the pins and disposed to ride on said cam surface, and means for biasing each pin downwardly with respect to said second sprocket member to thereby urge the bearing against said cam surface.

8. The unloader of claim 6, in which said pumping means comprises a cylinder communicating with said conduit means, piston means slidably disposed within said cylinder, and cam means associated with said second sprocket means and operably connected to said piston means for operating said piston means at periodic intervals during rotation of said second sprocket means to thereby pump said lubricating liquid through said conduit means.

References Cited by the Examiner
UNITED STATES PATENTS

| | | | |
|---|---|---|---|
| 2,841,454 | 7/1958 | Cheramie | 192—67 X |
| 3,145,815 | 8/1965 | Edwards et al. | 192—113 X |
| 3,252,598 | 5/1966 | Sherwood | 214—17 |

GERALD M. FORLENZA, *Primary Examiner.*

ROBERT G. SHERIDAN, *Examiner.*